US008618202B2

(12) United States Patent
Baran, Jr. et al.

(10) Patent No.: US 8,618,202 B2
(45) Date of Patent: Dec. 31, 2013

(54) POLYMER BLENDS INCLUDING SURFACE-MODIFIED NANOPARTICLES AND METHODS OF MAKING THE SAME

(75) Inventors: Jimmie R. Baran, Jr., Prescott, WI (US); Michael A. Johnson, Stillwater, MN (US); James D. Laperre, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 893 days.

(21) Appl. No.: 11/722,850

(22) PCT Filed: Dec. 22, 2005

(86) PCT No.: PCT/US2005/046987
§ 371 (c)(1),
(2), (4) Date: Jun. 26, 2007

(87) PCT Pub. No.: WO2006/083431
PCT Pub. Date: Aug. 10, 2006

(65) Prior Publication Data
US 2008/0214698 A1    Sep. 4, 2008

Related U.S. Application Data

(60) Provisional application No. 60/640,942, filed on Dec. 30, 2004.

(51) Int. Cl.
*C08K 3/18* (2006.01)
*C08K 3/22* (2006.01)

(52) U.S. Cl.
USPC ........... 524/431; 523/206; 524/408; 524/409; 524/413; 524/430; 524/437; 524/444; 524/493; 524/497

(58) Field of Classification Search
USPC .......... 523/206; 524/408, 409, 413, 430, 431, 524/493, 497, 437, 444
See application file for complete search history.

(56) References Cited

U.S. PATENT DOCUMENTS

| | | | |
|---|---|---|---|
| 2,801,185 | A | 7/1957 | Iler |
| 3,969,308 | A | 7/1976 | Penneck et al. |
| 4,379,201 | A | 4/1983 | Heilmann et al. |
| 4,455,205 | A | 6/1984 | Olson et al. |
| 4,478,876 | A | 10/1984 | Chung |
| 4,486,504 | A | 12/1984 | Chung |
| 4,491,508 | A | 1/1985 | Olson et al. |
| 4,522,958 | A | 6/1985 | Das et al. |
| 4,737,559 | A | 4/1988 | Kellen et al. |
| 5,037,579 | A | 8/1991 | Matchett |
| 5,258,225 | A | 11/1993 | Katsamberis |
| 5,648,407 | A | 7/1997 | Goetz et al. |
| 5,718,907 | A | 2/1998 | Labarre |
| 5,763,388 | A | 6/1998 | Lightsey et al. |
| 6,339,121 | B1 | 1/2002 | Rafailovich et al. |
| 6,586,483 | B2 * | 7/2003 | Kolb et al. .......... 521/91 |
| 6,727,309 | B1 * | 4/2004 | Paiva et al. .......... 524/438 |
| 7,101,616 | B2 * | 9/2006 | Arney et al. .......... 428/323 |
| 2002/0099119 | A1 | 7/2002 | Craig et al. |
| 2004/0029978 | A1 | 2/2004 | Chane-Ching |
| 2004/0099975 | A1 * | 5/2004 | Wu et al. .......... 264/4.1 |
| 2004/0147639 | A1 | 7/2004 | Tsou et al. |
| 2006/0134362 | A1 * | 6/2006 | Lu et al. .......... 428/40.1 |

FOREIGN PATENT DOCUMENTS

| | | |
|---|---|---|
| CN | 1434070 | 8/2003 |
| EP | 1406129 | 4/2004 |
| JP | 8-053630 | 2/1996 |
| JP | 2004-331883 A | 11/2004 |
| WO | 00/06495 | 2/2000 |
| WO | 00/74074 | 12/2000 |
| WO | 03/002652 | 1/2003 |
| WO | 2005/035683 | 4/2005 |
| WO | WO 2006/083431 A1 | 8/2006 |

OTHER PUBLICATIONS

Zang et al: "Kinetics-Controlled Compatibilization of Immiscible Polypropylene/polystyrene Blends using Nano-$SiO_2$ Particles" Polymeir, Elsevier Science Publishers B.V.GB vol. 45, No. 6 Mar. 2004, pp. 1913-1922, XP04490347.
International Preliminary Report on Patentability and Written Opinion of the International Searching Authority for PCT/US2005/046987 (11 pgs).
U.S. Appl. No. 60/640,942, filed Dec. 30, 2004, Baran, Jr. et al.

(Continued)

*Primary Examiner* — David W Wu
*Assistant Examiner* — Marie Reddick
(74) *Attorney, Agent, or Firm* — Stephen L. Crooks; Pamela L. Stewart

(57) ABSTRACT

The present invention relates to the use of surface-modified nanoparticles to alter the morphology and microstructure of polymer blends. The addition of surface modified nanoparticles to polymer blends comprised of immiscible polymers facilitates the uniform distribution of the dispersed phase of the polymer blend. In an embodiment, the present invention relates to a polymer blend comprising (1) a continuous phase comprising at least one polymer, monomer or oligomer, and a plurality of surface-modified nanoparticles, having a particle diameter of less than about 100 nanometers, distributed in the continuous polymer phase; and (2) a dispersed phase comprising at least one polymer, monomer or oligomer, wherein the continuous polymer phase and the dispersed polymer phase are immiscible.

17 Claims, 1 Drawing Sheet

(56) References Cited

OTHER PUBLICATIONS

"Handbook of Fillers for Plastics," Katz et al. eds., Van Nostrand Reinhold, New York, NY, copyright 1987, pp. 167-171, 174-178, and 181-183.

"*Health Effects of Synthetic Silica Particulates: a Symposium*," American Society for Testing and Materials, Baltimore, MD, 1981, pp. 146-148.

"Fumed Silica," About.com, New York, NY, definition copyright 1989, CRC Press LLC, retrieved from the internet at <URL: http://composite.about.com/library/glossary/f/bldef-f2371.htm> on Mar. 14, 2010; 2 pgs.

"*Polymer Nanocomposites Handbook*," Gupta et al. eds., CRC Press, Boca Raton, FL, copyright 2010, pp. 125-129.

"PPG Silica Products for Industrial Rubber Goods," PPG Industries, Pittsburgh, PA, copyright 2001-2010, retrieved from the internet at <URL: http://corporateportal.ppg.com/NA/Silicas/100_ProductsBySegment/120_IndustrialRubber/EN> on Mar. 14, 2010; 2 pgs.

"Zeolite Alpha," International Zeolite Association, Zurich, Switzerland, retrieved from the internet at <URL: http://iza-online.org/synthesis/Recipes/Zeolite%20Alpha.html> on Mar. 14, 2010; 2 pgs.

Bowen, P., "Particle Size Distribution Measurement from Millimeters to Nanometers and from Rods to Platelets", *Journal of dispersion Science and Technology*, Taylor and Francis Group, New York, NY, US, vol. 23, No. 5, Jan. 1, 2002, pp. 631-662.

He et al., "Fabrication of superhydrophobic coating via a facile and versatile method based on nanoparticle aggregates," *Applied Surface Science*, 2012; 258:2544-2550.

\* cited by examiner

POLYMER BLENDS INCLUDING SURFACE-MODIFIED NANOPARTICLES AND METHODS OF MAKING THE SAME

CROSS REFERENCE TO RELATED APPLICATIONS

This application is a national stage filing under 35 U.S.C. 371 of PCT/US2005/046987, filed Dec. 22, 2005, which claims priority to 60/640,942, filed Dec. 30, 2004, the disclosure of which is incorporated by reference in its/their entirety herein.

FIELD OF THE INVENTION

The present invention generally relates to polymer blends and more specifically to the alteration of polymer blend morphology by the use of surface modified nanoparticles.

BACKGROUND OF THE INVENTION

Multiphase polymer blends are of major economic importance in the polymer industry. Blending different polymers enables the production of new polymeric materials having an attractive balance of physical properties. For example, to enhance the impact strength of a brittle polymer such as polystyrene, small amounts of a rubbery polymer such as polybutadiene may be added to create a polymer blend which is tougher and more ductile than unblended polystyrene.

The development of useful polymer blends is difficult because of the inherent immiscibility of most polymers, which results in coarsely phase separated polymer mixtures in which the interfaces between components are compositionally sharp and mechanically weak. To overcome the problems created by inherently immiscible polymer blends, most commercial polymer blends consist of two polymers combined with small amounts of a third, compatibilizing polymer, such as a block or graft copolymer. In the polystyrene/polybutadiene example, a block or graft copolymer having polystyrene monomers and polybutadiene monomers may be used.

While the use of compatiblilizing polymers is effective in creating more stable blends of polymers, which would otherwise be immiscible, compatiblilizing polymers must be tailor made for the specific polymers used in a particular blend.

SUMMARY

The present invention relates to the use of surface-modified nanoparticles to alter the morphology and microstructure of polymer blends. The addition of surface modified nanoparticles to polymer blends comprised of immiscible polymers facilitates the uniform distribution of the dispersed phase of the polymer blend.

In an embodiment, the present invention relates to a polymer blend comprising: (1) a continuous phase comprising at least one polymer, monomer or oligomer, and a plurality of surface-modified nanoparticles having a particle diameter of less than about 100 nanometers dispersed in the continuous polymer phase, and (2) a dispersed phase comprising at least one polymer, monomer or oligomer, wherein the continuous polymer phase and the dispersed polymer phase are immiscible.

Further embodiments are variations of the invention are further described below.

DETAILED DESCRIPTION

Figure 1:
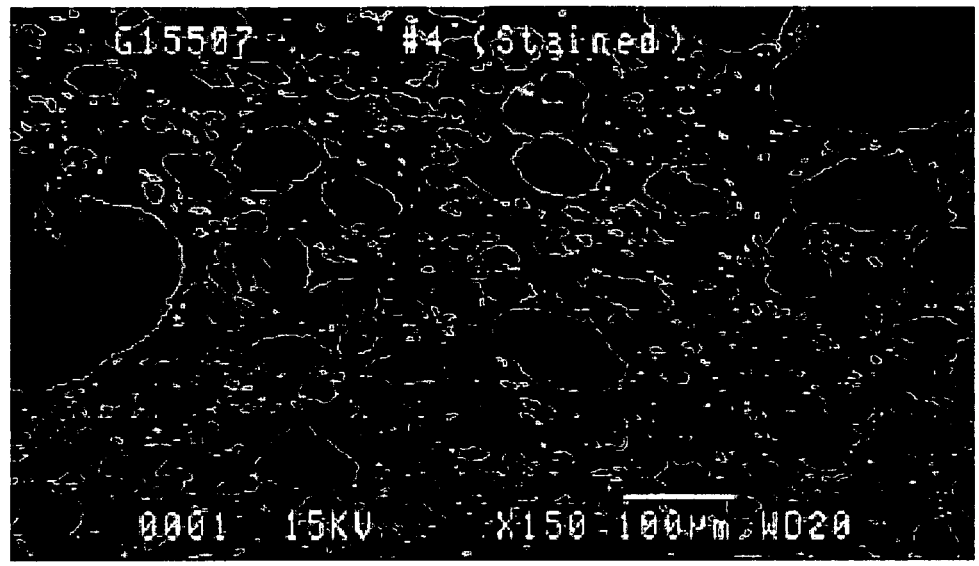
FIG. 1 is an SEM of Extruded Polymer Blend without Surface-Treated Particles

In an embodiment, the present invention relates to the use of surface modified nanoparticles to alter the morphology and microstructure of polymer blends. The addition of surface-modified nanoparticles to polymer blends comprised of immiscible polymers facilitates the uniform distribution of the dispersed phase of the polymer blend. In an embodiment, the surface-modified nanoparticles utilized in the present invention are individual inorganic, surface treated particles having a particle diameter of less than about 100 nanometers.

Inorganic particles, such as fumed silica having a particle size greater than 100 nm, are often included in many polymer blends, primarily as fillers or to alter the bulk physical properties of the polymer blend. Fillers may be used in polymers for a variety other of reasons, such as cost reduction, improved processing, density control, optical effects, thermal conductivity, control of thermal expansion, and improved mechanical properties, such as hardness and tear resistance. Typically, such inorganic particles used as fillers are not surface treated and are used at very high levels.

As used herein, the term "nanoparticle" refers to a particle having a diameter less than about 100 nanometers (nm). In some embodiments, nanoparticles refer to particles having a diameter less than about 50 nm. In further embodiments, nanoparticles refer to particles having a diameter less than about 20 nm, and in other embodiments, nanoparticles refer to particles having a diameter less than about 10 nm. The surface modified nanoparticles of the present invention are preferably individual particles, which are not associated, aggregated or agglomerated. If the nanoparticles are aggregated, the maximum cross-sectional dimension of the aggregated particle is within any of these ranges.

As used herein "polymer blend" means a mixture of two or more polymers, oligomers or monomers.

As used herein, the term "continuous phase" means the major component by weight of a polymer blend. The continuous phase of a polymer blend is typically not present in discrete, isolated domains.

As used herein, the term "dispersed phase" means the minor component by weight of a polymer blend. A polymer blend may have more than one dispersed phase present, wherein each dispersed phase is present in a lower amount by weight than the continuous phase. The dispersed phase of a polymer blend is typically present in discrete, isolated domains.

As used herein "co-continuous phases" refers to a polymer blend with two components at roughly equal levels, by weight.

"Phase-flipping" refers to a phenomenon wherein the dispersed and continuous phases flip, such that the continuous phase becomes the dispersed phase, and the dispersed phase becomes the continuous phase.

As used herein, the term "compatibilizer" or "compatibilizing agent" means a component that lowers the energy at the phase boundary between two or more components in a polymer blend. Compatibilizers as defined herein include, but are not limited to block and graft co-polymers, and surfactants.

As used herein, "immiscible polymers" refer to polymers that form polymer blends with limited solubility and non-zero interfacial tension, i.e., a blend having a free energy of mixing $(\Delta G_m)$ which is greater than zero:

$$\Delta G_m \cong \Delta H_m > 0$$

Typically, when two polymers are different in structure, the enthalpy of mixing ($\Delta H_m$) is positive because the energies of pair interactions are high, thus the polymers resist interaction. Conversely, when polymers are similar in structure, the enthalpy of mixing is negative, thus the free energy of mixing is also negative and the polymers will form a homogenous mixture. Thus "miscible polymers" are polymers that form blends having a free energy of mixing, which is less than zero.

In an embodiment, the polymer blends of the present invention include surface-modified nanoparticles having a particle diameter of less than 100 nanometers, disposed in the blend. The surface-modified nanoparticles are dispersed in the continuous phase of the polymer blend.

The surface-modified nanoparticles are selected such that the composition formed is free from a degree of particle association, agglomeration, or aggregation that would interfere with the desired, properties of the polymer composition. As used herein, particle "association" is defined as a reversible chemical combination due to any of the weaker classes of chemical bonding forces. Examples of particle association include hydrogen bonding, electrostatic attraction, London forces, van der Waals forces, and hydrophobic interactions. As used herein, the term "agglomeration" is defined as a combination of molecules or colloidal particles into clusters. Agglomeration may occur due to the neutralization of the electric charges, and is typically reversible. As used herein, the term "aggregation" is defined as the tendency of large molecules or colloidal particles to combine in clusters or clumps and precipitate or separate from the dissolved state. Aggregated particles are firmly associated with one another, and require high shear to be broken. Agglomerated and associated particles can generally be easily separated.

Aggregated forms of silica, such as fumed or precipitated silica consisting of small diameter primary particles firmly aggregated with one another into an irregular network, are not well suited for the application described herein. Such aggregates require high shear to be broken, and even when subjected to high shear forces, the aggregate is typically not broken down into individual primary particles. When surface treatment is done to larger aggregated particles, and the aggregates are subsequently broken apart by shear, new untreated particle surfaces are exposed which affects the particle solubility/dispersibility into a polymer component.

In the present invention, individual particles free from irreversible aggregation are utilized. When individual particles are surface treated, the surface treatment is distributed over the entire surface of the particle. The surface treatment prevents the particles from becoming irreversibly aggregated. Upon drying or being dispersed into a poor solvent, the particles may agglomerate into somewhat larger particles, however, the agglomerated surface treated particles can generally be easily separated, by dispersing into a more compatible solvent or with moderate shear, thereby re-obtaining the small individual surface-treated particles.

The surface-modified nanoparticles are selected to be compatible with the continuous phase of the polymer blend. For continuous phases that include a variety of components, the surface-modified nanoparticles may be selected to be compatible with at least one component of the continuous phase. It is important that the nanoparticles are dispersed in the continuous phase of the polymer blend, as the phase that the nanoparticles are compatible with will become the continuous phase. If the nanoparticles are compatible with the dispersed phase, phase-flipping may occur, wherein the dispersed phase becomes the continuous phase, and the continuous phase becomes the dispersed phase.

The surface-modified nanoparticles have surface groups that modify the solubility characteristics of the nanoparticles. The surface groups are selected to render the particle compatible with the continuous phase, e.g., a monomer of a polymer included in the continuous phase of the blend. Once the nanoparticles are incorporated into the continuous phase, the resulting composition, upon blending, forms a polymer blend containing a uniformly distributed dispersed phase. When the composition is polymerizable, the surface groups can be selected to associate or react with at least one component of the continuous phase to become part of the polymer network of the composition.

Various methods may be used to assess the compatibility of the surface-modified nanoparticles with the continuous phase. For transparent continuous phases, one useful method of assessing the compatibility of the surface-modified nanoparticles with the transparent continuous phase includes combining the surface-modified nanoparticles and the continuous phase and observing whether the surface-modified nanoparticles appear to dissolve in the continuous phase, such that the resulting composition is transparent. The nature of the inorganic particle component of the surface-modified nanoparticle will prevent the surface-modified nanoparticle from actually dissolving in the continuous phase, i.e., the surface-modified nanoparticles will be dispersed in the continuous phase, however the compatibility of the surface groups with the continuous phase will give the surface-modified nanoparticles the appearance of dissolving in the continuous phase. As the size of the surface-modified nanoparticles increases, the haziness of the continuous phase generally increases. Preferred surface-modified nanoparticles are selected such that they do not settle out of the continuous phase.

Suitable surface groups can also be selected based upon the solubility parameter of the surface group and the continuous phase. Preferably the surface group, or the agent from which the surface group is derived, has a solubility parameter similar to the solubility parameter of the continuous phase. When the continuous phase is hydrophobic, for example, one skilled in the art can select from among various hydrophobic surface groups to achieve a surface-modified particle that is compatible with the hydrophobic continuous phase. Similarly, when the continuous phase is hydrophilic, one skilled in the art can select from hydrophilic surface groups, and, when the continuous phase is a fluorocarbon, one skilled in the art can select from among various fluorocarbon surface groups.

The particle can also include at least two different surface groups that combine to provide a particle having a solubility parameter that is similar to the solubility parameter of the continuous phase. The surface groups may be selected to provide a statistically averaged, randomly surface-modified particle.

The surface groups are present on the surface of the particle in an amount sufficient to provide surface-modified nanoparticles that are capable of being subsequently dispersed in the continuous phase without aggregation. The surface groups preferably are present in an amount sufficient to form a monolayer, preferably a continuous monolayer, on the surface of the particle.

Surface modifying groups may be derived from surface modifying agents. Schematically, surface modifying agents can be represented by the formula A-B, where the A group is capable of attaching to the surface of the particle and the B group is a group that is capable of attaching or strongly associating with a component in the continuous phase. Depending on the characteristics of the continuous phase, surface-modifying groups can be selected to render the particle relatively more polar, relatively less polar or relatively non-polar.

Suitable classes of surface-modifying agents include, e.g., silanes, organic acids organic bases and alcohols.

Particularly useful surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy)silane, vinyltris(isopropenoxy)silane and vinyltris(2-methoxyethoxy)silane; trialkoxyarylsilanes; isooctyltrimethoxy-silane; N-(3-triethoxysilylpropyl)methoxyethoxyethoxy ethyl carbamate; N-(3-triethoxysilylpropyl)methoxyethoxyethoxyethyl carbamate; silane functional (meth)acrylates including, e.g., 3-(methacryloyloxy)propyltrimethoxysilane, 3-acryloyloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Methods of surface-modifying silica using silane functional (meth)acrylates are described, e.g., in U.S. Pat. Nos. 4,491,508 and 4,455,205 (Olsen et al.); U.S. Pat. Nos. 4,478,876 and 4,486,504 (Chung), and U.S. Pat. No. 5,258,225 (Katsamberis), the entire disclosures of which are incorporated by reference herein.

Useful organic acid surface-modifying agents include, e.g., oxyacids of carbon (e.g., carboxylic acid), sulfur and phosphorus, and combinations thereof.

Representative examples of polar surface-modifying agents having carboxylic acid functionality include $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA) and mono(polyethylene glycol)succinate.

Representative examples of non-polar surface-modifying agents having carboxylic acid functionality include octanoic acid, dodecanoic acid and oleic acid.

Examples of suitable phosphorus containing acids include e.g., octylphosphonic acid, laurylphosphonic acid, decylphosphonic acid, dodecylphosphonic acid and octadecylphosphonic acid.

Useful organic base surface-modifying agents include, e.g., alkylamines including, e.g., octylamine, decylamine, dodecylamine and octadecylamine.

Examples of other useful non-silane surface modifying agents include acrylic acid, methacrylic acid, beta-carboxyethyl acrylate, mono-2-(methacryloyloxyethyl)succinate, and combinations thereof. A useful surface modifying agent that imparts both polar character and reactivity to the nanoparticles is mono(methacryloyloxypolyethyleneglycol)succinate.

Examples of suitable surface-modifying alcohols include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof. When the continuous phase includes aromatic ring containing epoxy resins, useful surface-modifying groups can include an aromatic ring. Examples of surface-modifying groups particularly suitable for epoxy resin compositions are disclosed in U.S. Pat. No. 5,648,407 (Goetz et al.), the entire disclosure of which is incorporated by reference herein.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.), the entire disclosure of which is incorporated by reference herein.

In an embodiment, the nanoparticles are inorganic. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles have an average particle diameter less than about 100 nm in one embodiment, less than about 50 nm in another embodiment, from about 3 nm to about 50 nm in a further embodiment, from about 3 nm to about 20 nm in another embodiment, and from about 3 nm to about 10 nm in a further embodiment. If the nanoparticles are aggregated, the maximum cross sectional dimension of the aggregated particle is within any of these ranges.

Useful surface-modified zirconia nanoparticles include carboxylic acids, for example, a combination of oleic acid and acrylic acid adsorbed onto the surface of the particle.

Useful surface-modified silica nanoparticles include silica nanoparticles surface-modified with silane surface modifying agents including, e.g., acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof, and organotitanates and mixtures thereof.

The nanoparticles may be in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.

Useful metal oxide colloidal dispersions include colloidal zirconium oxide, suitable examples of which are described in U.S. Pat. No. 5,037,579, the entire disclosure of which is incorporated by reference herein, and colloidal titanium oxide, useful examples of which are described in PCT Publication No. WO 00/06495 entitled, "Nanosize Metal Oxide Particles for Producing Transparent Metal Oxide Colloids and Ceramers," (Arney et al.) filed Jul. 30, 1998, also incorporated by reference herein in its entirety.

In general, the nanoparticles may be added at any time during the preparation of the final polymer blend, and various methods may be employed to combine the surface-modified nanoparticles and the continuous phase. In one method, a colloidal dispersion of surface-modified nanoparticles and continuous phase are combined. Solvent present in the composition is then removed, leaving the surface-modified nanoparticdes dispersed in the continuous phase. The solvent may be removed by evaporation including, e.g., distillation, rotary evaporation or oven drying. Optionally, for some colloidal dispersions, e.g., aqueous colloidal dispersions, prior to addition of the continuous phase, a cosolvent (e.g., methoxy-2-propanol or N-methylpyrrolidone) may be added to the colloidal dispersion to assist removal of water. After the continuous phase is added, the water and cosolvent are removed.

Another method for incorporating colloidal dispersions of surface-modified nanoparticles into a continuous phase includes drying the colloidal dispersion of surface-modified nanoparticles to a powder, followed by addition of the continuous phase or at least one component of the continuous phase into which the nanoparticles are to be dispersed. The drying step may be accomplished by conventional means such as oven drying or spray drying. The surface-modified nanoparticles preferably have a sufficient amount of surface groups to prevent irreversible aggregation upon drying. The drying time and the drying temperature is preferably minimized for nanoparticles having less than 100% surface coverage.

Surface-modified nanoparticles may be present in the composition in varying amounts including, e.g., from about 0.1% by dry weight to about 70% by dry weight, from about 0.1% by dry weight to about 30% by dry weight, from about 0.1% by dry weight to about 10% by dry weight, from about 0.1% by dry weight to about 5% by dry weight, and from about 0.1% by dry weight to about 1% by dry weight, based on the total weight of the composition. The surface-modified nanoparticles are preferably dispersed throughout the continuous phase, and ideally dispersed homogeneously throughout the continuous phase.

The continuous phase of the composition may be a solid, semi-solid, liquid or mixtures thereof, including, e.g., a solution, emulsion, suspension, dispersion, syrup and melt. The continuous phase is selected based upon the desired properties of the composition including, e.g., stiffness, hardness, density, volume, transparency, flexibility, conformability, resilience, creep, strength modulus elongation, chemical resistance, temperature resistance, environmental resistance and compressibility.

A number of materials may be used as the continuous or dispersed phase of the polymer blend. The continuous phase may be comprised of one or more monomers, oligomers, or polymers. Examples of useful organic continuous phases include natural and synthetic rubber resins including thermosettable rubbers as well as thermoplastic rubbers and elastomers including, e.g., nitrile rubbers (e.g., acrylonitrile-butadiene), polyisoprene rubber, polychloroprene rubber, polybutadiene rubber, butyl rubber, ethylene-propylene-diene monomer rubbers (EPDM), Santoprene®, polypropylene-EPDM elastomers, ethylene-propylene rubber, styrene-butadiene copolymers, styrene-isoprene copolymers, styrene-butadiene-styrene rubber, styrene-isoprene-styrene rubber, styrene-ethylene-butylene-styrene rubber, styrene-ethylene-propylene-styrene rubber, polyisobutylene rubber, ethylene vinyl acetate rubbers, silicone rubbers including, e.g., polysiloxanes, methacrylate rubbers, polyacrylate rubbers including, e.g., copolymers of isooctyl acrylate and acrylic acid, polyesters, polyether esters, polyvinyl ethers, polyurethanes and blends and combinations thereof, including e.g., linear, radial, star and tapered block copolymers thereof.

Other useful elastomers include, e.g., fluoroelastomers including, e.g., polytrifluoroethylene, polyvinylidene fluoride, hexafluoropropylene and fluorinated ethylene-propylene copolymers, fluorosilicones and chloroelastomers including, e.g., chlorinated polyethylene, and combinations thereof.

Examples of useful thermoplastic resins include polyacrylonitrile, acrylonitrile-butadiene-styrene, styrene-acrylonitrile, cellulose, chlorinated polyether, ethylenevinylacetate, fluorocarbons including, e.g., polychlorotrifluoroethylene, polytetrafluoroeythylene, fluorinated ethylene-propylene and polyvinylidene fluoride, polyamides including, e.g., polycaprolactam, polyhexamethylene adipamide, polyhexamethylene sebacamide, polyundecanoamide, polylauroamide and polyacrylamide, polyimides including, e.g., polyetherimide, polycarbonate, polyolefins including, e.g., polyethylene, polypropylene, polybutene and poly-4-methyl pentene, polyalkylene terephthalates including e.g., polyethyleneterephthalate, polyalkylene oxides including, e.g., polyphenylene oxide, polystyrene, polyurethane, polyisocyanurates, vinyl polymers including, e.g., polyvinyl chloride, polyvinyl acetate, polyvinyl alcohol, polyvinyl butyral, polyvinylpyrrolidone, polyvinylidene chloride and combinations thereof.

Useful thermosettable resins include e.g., polyesters and polyurethanes and hybrids and copolymers thereof including, e.g., acylated urethanes and acylated polyesters, amino resins (e.g., aminoplast resins) including, e.g., alkylated urea-formaldehyde resins, melamine-formaldehyde resin, acrylate resins including, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones, alkyd resins such as urethane alkyd resins, polyester resins, reactive urethane resins, phenolic resins including, e.g., resole resins, novolac resins and phenol-formaldehyde resins, phenolic/latex resins, epoxy resins including, e.g., bisphenol epoxy resins, aliphatic and cycloaliphatic epoxy resins, epoxy/urethane resin, epoxy/acrylate resin and epoxy/silicone resin, isocyanate resins, isocyanurate resins, polysiloxane resins including alkylalkoxysilane resins, reactive vinyl resins and mixtures thereof.

The continuous phase may be selected to provide an adhesive composition including, e.g., pressure sensitive, hot melt, thermoset and thermoplastic adhesive compositions. The continuous phase can include any pressure-sensitive adhesive composition including, e.g., solvent-coatable, hot-melt-coatable, radiation-curable (E-beam, actinic including, e.g., visible and UV, and thermal), water-based emulsion type adhesives and combinations thereof. Suitable pressure sensitive adhesive compositions include, e.g., tackified rubber adhesives, e.g., natural rubber, olefins, silicones, polyisoprenes, polybutadiene, polyurethanes, styrene-isoprene-styrene and styrene-butadiene-styrene block copolymers and other elastomers, and tackified and untackified acrylic adhesive compositions including copolymers of isooctyl acrylate and acrylic acid.

Acrylate pressure sensitive adhesives are well known in the art. Many of these adhesives are copolymers of an alkyl ester of acrylic acid and, optionally, a minor portion of a co-monomer. Useful acrylic acid esters include acrylic or methacrylic acid esters of a monohydric alcohol having from 1 to 20 carbon atoms including, e.g., isooctyl acrylate, 2-ethylhexyl acrylate, isononyl acrylate, isodecyl acrylate, decyl acrylate, dodecyl acrylate, lauryl acrylate, hexyl acrylate, butyl acrylate, and octadecyl acrylate and combinations thereof. Other useful monomers for acrylate-based adhesive compositions include ethylenically-unsaturated monomers including, e.g., cyclohexyl acrylate, isobornyl acrylate, N-octylacrylamide, t-butyl acrylate, methyl methacrylate, ethyl methacrylate and propyl methacrylate and combinations thereof. Other useful ethylenically unsaturated monomers include, e.g., acrylic acid, methacrylic acid, itaconic acid, substituted acrylamides including, e.g., N,N-dimethylacrylamide, N-vinyl-2-pyrrolidone, N-vinyl caprolactam, acrylonitrile, tetrahydrofurfuryl acrylate, glycidyl acrylate, 2-phenoxyethyl acrylate and benzyl acrylate, and combinations thereof.

The continuous phase can also include other ingredients including, e.g., initiators, curing agents, cure accelerators, catalysts, crosslinking agents, tackifiers, plasticizers, dyes, flame retardants, coupling agents, pigments, impact modifiers, flow control agents, foaming agents, fillers, glass and polymer microspheres and microparticles, other particles including electrically conductive particles, thermally conductive particles, fibers, antistatic agents, antioxidants and UV absorbers.

Where the continuous phase includes monomers, polymerization can be achieved by various conventional free radical polymerization methods, which can be chemical or radiation initiated, including, e.g., solvent polymerization, emulsion polymerization, suspension polymerization, bulk polymerization and radiation polymerization including, e.g., processes using actinic radiation including, e.g., visible and ultraviolet light, electron beam radiation and combinations thereof.

Useful free radical initiators include thermal and photoactive initiators. The type of initiator used depends on the polymerization process. Examples of photoinitiators include benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone.

The continuous phase can also include copolymeric photoinitiators including, e.g., 2-[4-(2-hydroxy-2-methylpropenoyl)phenoxy]ethyl-2-methyl-2-N-propenoylamino propanoate and the polymerizable photoinitiator available under the trade designation DAROCUR ZLJ 3331 from Ciba-Geigy, and photoacid generated initiators including, e.g., diaryliodoniumhexafluoroantimonate available under the trade designation SarCat CD-1012 from Sartomer (Exton, Pa.) and triarylsulfonium hexafluorophosphate available under the trade designation SarCat CD-101 1 (Sartomer).

Examples of suitable thermal initiators include peroxides such as benzoyl peroxide, dibenzoyl peroxide, dilauryl peroxide, cyclohexane peroxide, methyl ethyl ketone peroxide, hydroperoxides including, e.g., butyl hydroperoxide and cumene hydroperoxide, dicyclohexyl peroxydicarbonate, t-butyl perbenzoate, and azo compounds, for example, 2,2,-azo-bis(isobutyronitrile) (AIBN) and combinations thereof. Examples of commercially available thermal initiators include initiators available under the "VAZO" trade designation from DuPont Specialty Chemical (Wilmington, Del.) including VAZO 64 (2,2'-azobis(isobutyronitrile)), VAZO 52, VAZO 65 and VAZO 68, as well as thermal initiators available under the trade designation "Lucidol" from Elf Atochem North America, (Philadelphia, Pa.), and initiators available under the Celogen trade designation from Uniroyal Chemical Co. (Middlebury, Conn.).

An initiator is used in an amount effective to facilitate polymerization of the monomers present in the composition and the amount will vary depending upon, for example, the type of initiator, the molecular weight of the initiator, the intended application of the resulting adhesive composition and the polymerization process including, e.g., the temperature of the process.

The composition may be cross-linked to alter the properties of the composition. Cross-linking can be achieved with or without a cross-linking agent by using high energy radiation such as gamma or electron beam radiation. A cross-linking agent or a combination of cross-linking agents can be added to the mixture of polymerizable monomers to facilitate cross-linking.

Useful radiation curing cross-linking agents include multifunctional acrylates, such as those disclosed in U.S. Pat. No. 4,379,201 (Heilmann et al.), incorporated by reference herein in its entirety, which include 1,6-hexanediol diacrylate, trimethylolpropane triacrylate, 1,2-ethylene glycol diacrylate, pentaerythritol tetraacrylate, 1,12-dodecanol diacrylate, and combinations thereof, and copolymerizable aromatic ketone co-monomers such as those disclosed in U.S. Pat. No. 4,737,559 (Kellen et al.), the entire disclosure of which is incorporated by reference herein. Suitable ultraviolet light sources include, e.g., medium pressure mercury lamps and ultraviolet black light.

A polymerizable monomer composition may also include a chain transfer agent. The chain transfer agent is preferably soluble in the monomer mixture prior to polymerization. Examples of suitable chain transfer agents include triethyl silane and mercaptans.

The components of the polymer composition can be selected to provide materials suitable for use in a variety of applications. Representative examples include adhesives, applications in the automotive industry including, e.g., automotive body moldings, applications in the construction industry including, e.g., structural components, e.g., sized lumber, shaped trim, posts, beams and shaped structural members, lightweight ceramics including, e.g., pre-cast and cast-in-place construction materials including, e.g., cementitious and gypsum materials such as blocks, boards, panels, roof decks and flooring, landfill covers, odor barriers, and dust covers.

The invention will now be described further by way of the following examples. All parts, ratios, percents and amounts stated in the Examples are by weight unless otherwise specified.

EXAMPLE

Hydrophobically Modified Nanoparticle Synthesis 250 g Nalco 2326 (5 nm porous silica particles) is placed in a three-neck round bottom flask, equipped with a mechanical stirrer and a reflux condenser. While stirring the silica solution, a solution of 15.36 g of isooctyltrimethoxysilane (Gelest, Tullytown, Pa.) and 281.25 g 1-methoxy-2-propanol (Sigma-Aldrich, Milwaukee, Wis.) is added. The mixture is heated at 80° C. for 16 hours. The reaction is cooled and the modified particles are recovered by drying in a vented oven at 150° C.

Extrusion Experiment

An acrylic-based adhesive formulation that was partially polymerized in TDX pouches (93/7/0.02 isooctyl acrylate/acrylic acid/Irgacure 651) was extruded with 96% Kraton RP6240 in an approximate ratio of 65/35 by weight. The acrylate is the continuous phase.

Figure 2:
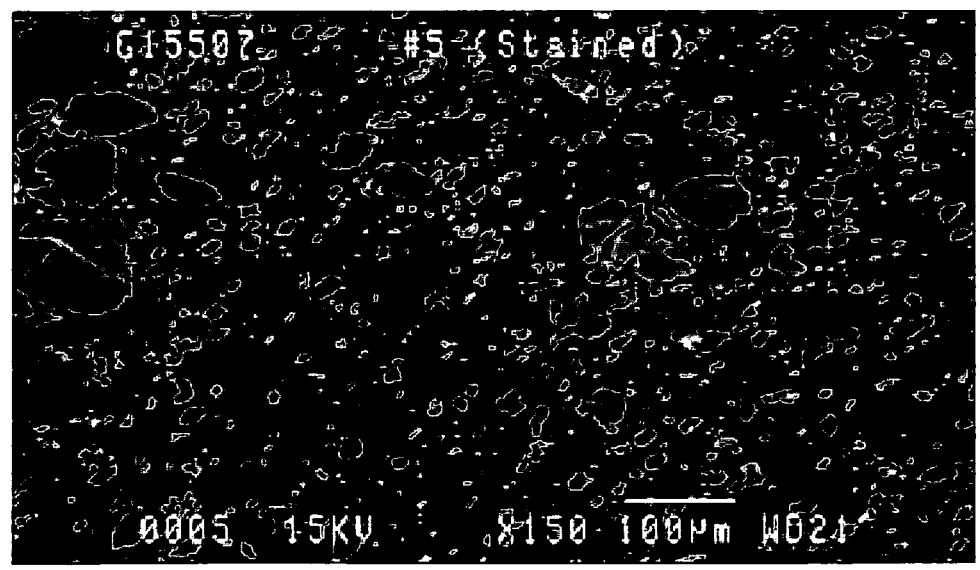
FIG. 2 is an SEM of Extruded Polymer Blend with 1% Surface Treated Particles by weight

Consecutive runs were made without and with the particles described above. Particles were put into the next-to-last port of the extruder and were run at 1% by weight. A visual comparison of the end-product adhesives showed that the surface of the blend with particles was smoother. FIGS. 1 and 2 show micrographs of the two systems. The micrograph of FIG. 1 depicts the polymer blend made without nanoparticles, and the micrograph of FIG. 2 depicts the polymer blend made with nanoparticles.

The black region in the micrographs is the acrylate polymer, while the gray domains are the Kraton. As can be seen from the micrographs, the average Kraton domain size has been reduced, while the number of domains has increased.

The invention claimed is:

1. A polymer blend comprising:
   a continuous phase comprising an acrylic polymer, and a plurality of non-aggregated surface-modified nanoparticles, having a particle diameter of less than about 100 nanometers, distributed in the continuous phase; and
   a dispersed phase comprising at least one polymer, monomer or oligomer, wherein the continuous phase and the dispersed phase are immiscible;
   wherein the nanoparticles are present in an amount of no greater than 5% by dry weight, based on the total weight of the blend.

2. The polymer blend of claim 1, wherein the nanoparticles have a particle diameter of less than about 20 nanometers.

3. The polymer blend of claim 1, wherein the nanoparticles are selected from the group consisting of silica, titania, alumina, zirconia, vanadia, ceria, iron oxide, antimony oxide, tin oxide, aluminum/silica, and combinations thereof.

4. The polymer blend of claim 1, wherein the nanoparticles comprise surface groups selected from the group consisting of hydrophobic groups, hydrophilic groups and combinations thereof.

5. The polymer blend of claim 1, wherein the nanoparticles comprise surface groups derived from a compound selected from the group consisting of a silane, an organic acid, an organic base, and combinations thereof.

6. The polymer blend of claim 1, wherein the nanoparticles comprise organosilyl surface groups derived from a compound selected from the group consisting of alkylsilane, arylsilane, alkoxysilane, and combinations thereof.

7. The polymer blend of claim 1, wherein the nanoparticles comprise surface groups derived from a compound selected from the group consisting of carboxylic acids, sulfonic acids, phosphoric acids and combinations thereof.

8. The polymer blend of claim 1, wherein the nanoparticles comprise at least about 0.1% by dry weight, based on the total weight of the blend.

9. The polymer blend of claim 8, wherein the nanoparticles comprise about 0.1% by dry weight to about 1% by dry weight, based on the total weight of the blend.

10. The polymer blend of claim 1, wherein the nanoparticles comprise surface groups having a solubility parameter similar to that of the continuous phase.

11. The polymer blend of claim 1, wherein the nanoparticles comprise silica.

12. The polymer blend of claim 1, wherein the polymer adhesive comprises a copolymer of isooctyl acrylate and acrylic acid.

13. A method of making a polymer blend comprising:
    providing a continuous phase comprising an acrylic polymer;
    blending a plurality of non-aggregated surface-modified nanoparticles having a diameter of less than about 100 nm into the continuous phase;
    blending a dispersed phase comprising at least one polymer, monomer or oligomer into the nanoparticle-containing continuous phase, wherein the continuous phase and the dispersed phase are immiscible;
    wherein the nanoparticles are present in an amount of no greater than 5% by dry weight, based on the total weight of the blend.

14. The method of claim 13, wherein the polymer blend contains at least about 0.1% by dry weight of surface-modified nanoparticles, based on the total weight of the blend.

15. The method of claim 14, wherein the polymer blend contains at most about 1% by dry weight of surface-modified nanoparticles, based on the total weight of the blend.

16. The method of claim 13, wherein the nanoparticles comprise silica.

17. The method of claim 13, wherein the acrylic polymer comprises a copolymer of isooctyl acrylate and acrylic acid.

* * * * *